J. M. Cayce.
Portable Forge.

No. 3,894. Reissued Mar. 22. 1870.

Witnesses;
Charles A. Pettit
Victor Hagmann

Inventor;
John M. Cayce
By Munn & Co
Attorneys.

N. PETERS, PHOTO-LITHOGRAPHER, WASHINGTON, D. C.

United States Patent Office.

A. THOMAS, OF FRANKLIN, TENNESSEE, ASSIGNEE OF JOHN M. CAYCE.

*Letters Patent No.* 67,845, *dated August* 20, 1867; *reissue No.* 3,894, *dated March* 22, 1870.

IMPROVED PORTABLE FORGING-APPARATUS.

The Schedule referred to in these Letters Patent and making part of the same

*To all whom it may concern:*

Be it known that JOHN M. CAYCE, of Franklin, in the county of Williamson and State of Tennessee, did invent a new and improved Portable Forge; and I, A. THOMAS, of Franklin aforesaid, assignee of the said JOHN M. CAYCE, do hereby declare that the following is a full, clear, and exact description thereof, which will enable others skilled in the art to make and use the same, reference being had to the accompanying drawings forming part of this specification, in which—

Similar letters of reference indicate corresponding parts.

Figure 1:
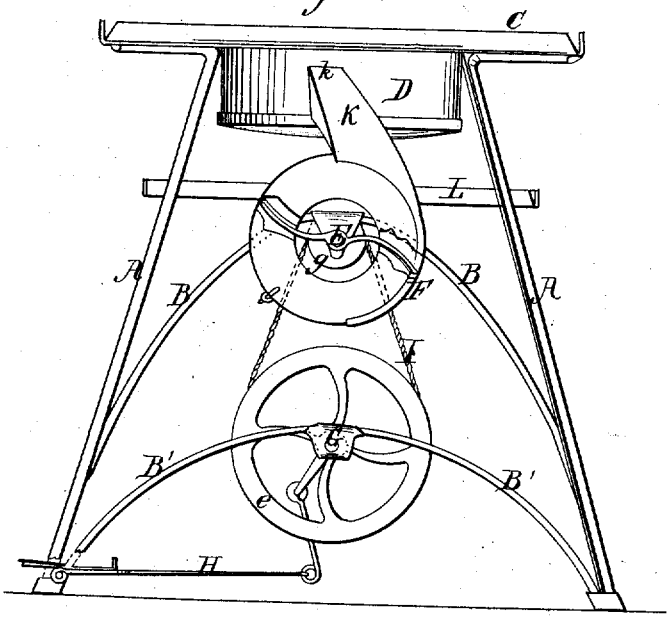
Figure 1 is a side elevation of my invention.
Figure 2:
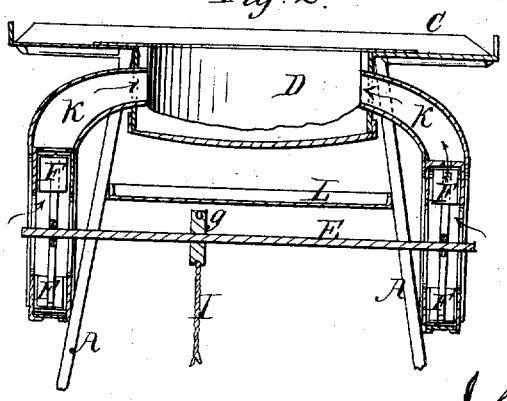
Figure 2 is a transverse vertical section of the same.

This invention relates to a new forge in which the blast is obtained from a fan or fans situated beneath the forge.

In order that others skilled in the art to which this invention appertains may make and use the same, I will proceed to describe it in detail.

In the drawings—

A A represent the legs of the table which holds the forge, strengthened, if desired, by arched or other braces B B′.

C is the table, which is made of iron or other suitable material, and contains the fire-pot D, which is a vessel countersunk in the table.

E is a shaft having its bearings in the braces or in any part of the frame, and carrying at its extremities the fan-wheels F F.

G is another shaft, situated below the first, running also in bearings of the braces, and worked by a treadle, H, or other equivalent mechanism.

A belt, I, connects the pulleys *g* which transmit the power applied at the treadle, or its equivalent, to the fan-wheels.

The shaft G may, if desired, be dispensed with.

K K are pipes or ducts, extending from the upper part of the case or cases which inclose the fans, to the sides of the fire-pot D at *k k*, and conducting the currents of air from the fan-boxes to the fire-pot.

Beneath the table is or may be a horizontal shelf, L, for convenience in holding tools, materials, &c., which are to be used about the forge.

The several parts of the frame of the forge thus constructed may be cast in one piece.

The fans, boxes, and wind-tubes may be all of tin.

The shelf L may be of tin or sheet-iron, and may be entirely dispensed with.

The apertures *k k*, at which the air is discharged into the fire-pot, are designed to be opposite each other, and to discharge the currents in such a direction that they shall meet in the center of the fire-pot.

The invention is not intended to be limited to the use of two apertures *k k*, but may have any number as upon experiment may prove to be best adapted to the efficient working of the forge.

Among the merits of a forge of this construction may be mentioned not only its exceeding cheapness, lightness, and simplicity, all of which will be apparent at a glance, but the regularity with which the blast is generated, and the manner in which it reaches the fire.

Two great defects in the portable forge worked by a bellows are, first, that the blast furnished by a bellows is always irregular, and especially so in a portable forge, where the apparatus is small and can contain but little air at once; and secondly, that from the same reason the apertures corresponding to *k k*, whence the blast is discharged upon the fire, must be small, and the stream of air that reaches the fire correspondingly small.

In this forge these defects do not exist. The air is supplied with perfect regularity, without sudden interruptions, and in any required quantities, and the apertures *k k* may be of any size required.

The heating-power of this forge is, for the above reasons, much greater than that of the common portable forges.

Either the fan-wheels or the pulley *g* may be made heavy enough to operate as fly-wheels if desired, or separate fly-wheels may be attached.

What is claimed as new, and desired to be secured by Letters Patent, is—

1. The combination of fire-pot D, table C, fans F F, pipes K K, shafts E S, pulleys *g e*, braces B B′, crank-wheel E, and treadle M, all arranged and brought together to form a portable forge, as described.

2. The pot D, constructed and located as set forth, in combination with pipes K K and rotary fans F F, arranged as specified, to force two opposite currents of air into conflict over the center of the fire, and thereby promote a more complete combustion.

A. THOMAS.

Witnesses:

G. W. HICKS,

ROBT. WILSON.